United States Patent
Zhang et al.

(10) Patent No.: US 9,621,798 B2
(45) Date of Patent: Apr. 11, 2017

(54) GRID-BASED IMAGE RESOLUTION ENHANCEMENT FOR VIDEO PROCESSING MODULE

(71) Applicant: GM GLOBAL TECHNOLOGY OPERATIONS LLC, Detroit, MI (US)

(72) Inventors: Wende Zhang, Troy, MI (US); Jinsong Wang, Troy, MI (US); Brunno L. Moretti, Walled Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/790,394

(22) Filed: Jul. 2, 2015

(65) Prior Publication Data

US 2016/0006932 A1    Jan. 7, 2016

Related U.S. Application Data

(60) Provisional application No. 62/021,631, filed on Jul. 7, 2014.

(51) Int. Cl.
*H04N 5/262* (2006.01)
*H04N 5/232* (2006.01)
*B60R 1/00* (2006.01)
*H04N 5/357* (2011.01)
*G06T 3/00* (2006.01)

(52) U.S. Cl.
CPC ........... *H04N 5/23235* (2013.01); *B60R 1/00* (2013.01); *G06T 3/0093* (2013.01); *H04N 5/2628* (2013.01); *H04N 5/3572* (2013.01); *H04N 5/23216* (2013.01)

(58) Field of Classification Search
CPC ...... H04N 5/232; H04N 5/262; H04N 5/3572; H04N 5/23216; H04N 5/23235; H04N 5/2628; B60R 1/00; G06T 3/0093
See application file for complete search history.

(56) References Cited

U.S. PATENT DOCUMENTS

| 9,386,302 B2 * | 7/2016 | Zeng | H04N 17/002 |
| 2014/0085409 A1 * | 3/2014 | Zhang | H04N 5/23238 348/36 |

* cited by examiner

Primary Examiner — Tuan Ho
(74) Attorney, Agent, or Firm — John A. Miller

(57) ABSTRACT

A method for providing a high resolution display image that includes providing a camera image that can be processed into at least two different camera views. The method also includes identifying a warped grid in each of the at least two different camera views and identifying a minimum field of view for displaying each of the at least two different camera views. The method further includes cropping the camera image based on the identified minimum field of view and de-warping the at least two different camera views to provide the high resolution display image.

20 Claims, 11 Drawing Sheets

GRID-BASED IMAGE RESOLUTION ENHANCEMENT FOR VIDEO PROCESSING MODULE

CROSS-REFERENCE TO RELATED APPLICATIONS

This application claims the benefit of the priority date of U.S. Provisional Patent Application Ser. No. 62/021,631, entitled, "Grid-Based Image Resolution Enhancement for Video Processing Module", filed Jul. 7, 2014.

BACKGROUND OF THE INVENTION

Field of the Invention

This invention relates generally to a system and method for grid-based image resolution enhancement for video processing and, more particularly, to a system and method for providing a high resolution display image by de-warping a warped grid in each of at least two different camera views.

Discussion of the Related Art

Modern vehicles generally include one or more cameras that provide back-up assistance, take images of the vehicle driver to determine driver drowsiness or attentiveness, provide images of the road as the vehicle is traveling for collision avoidance purposes, provide structure recognition, such as roadway signs, etc. Current front view and rear view cameras on vehicles are typically wide field-of-view (FOV) cameras, for example, a 135° FOV. Wide FOV cameras typically provide curved images that cause image distortion around the edges of the image. Various approaches are known in the art to provide distortion correction for the images of these types of cameras, including using a model based on a pinhole camera and models that correct for radial distortion by defining radial parameters.

It has been proposed in the art to provide a surround view camera system on a vehicle that includes a front camera, a rear camera and left and right side cameras, where the camera system generates a top down view of the vehicle and surrounding areas using the images from the cameras, and where the images overlap each other at the corners of the vehicle. The top down view can be displayed for the vehicle driver to see what is around the vehicle for ease of backing up, parking, etc. Further, future vehicles may not employ rearview mirrors, but may instead include digital images provided by the surround view cameras.

In order to provide a surround view completely around the vehicle with a minimal number of cameras, available wide FOV cameras having a 135° FOV will not provide the level of coverage desired, and thus, the cameras will need to be ultra-wide FOV cameras having a 180° or greater FOV. These types of ultra-wide FOV cameras are sometimes referred to as fish-eye cameras because their image is significantly curved or distorted. In order to be effective for vehicle back-up and surround view applications, the distortions in the images need to be corrected.

Optimization of the display resolution of one camera is known, as described in Patent Application Publication No. 2014/0085409 A1 entitled, "Wide FOV Camera Image Calibration and De-Warping," filed Mar. 15, 2013, assigned to the assignee of the present application and incorporated herein by reference. However, there is a need in the art to optimize the display resolution of multiple camera views that are created from multiple vehicle images and cameras.

SUMMARY OF THE INVENTION

In accordance with the teachings of the present invention, a method is disclosed for providing a high resolution display image that includes providing a camera image that can be processed into at least two different camera views. The method also includes identifying a warped grid in each of the at least two different camera views and identifying a minimum field of view for displaying each of the at least two different camera views. The method further includes cropping the camera image based on the identified minimum field of view and de-warping the at least two different camera views to provide the high resolution display image.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for grid-based image resolution enhancement is merely exemplary in nature, and is in no way intended to limit the invention or its applications or uses. For example, the present invention has application for image resolution enhancement of vehicle cameras. However, as will be appreciated by those skilled in the art, the present invention will have application for correcting distortions in other cameras.

Reference throughout the specification using phrases such as "various embodiments," "some embodiments," "one embodiment," "some example embodiments," "one example embodiment," "an embodiment" or similar language means that a particular feature, structure or characteristic described in connection with any embodiment is included in at least one embodiment, meaning that the phrases set forth above, or similar language, as used throughout the specification, are not necessarily referring to the same embodiment. Particular features, structures or characteristics described in the specification may be combined in any suitable manner in one or more embodiments, thus, any failure to specifically describe a combination or sub-combination of particular features should not be understood as an indication that combinations or sub-combinations of features is/are not possible.

Figure 1:
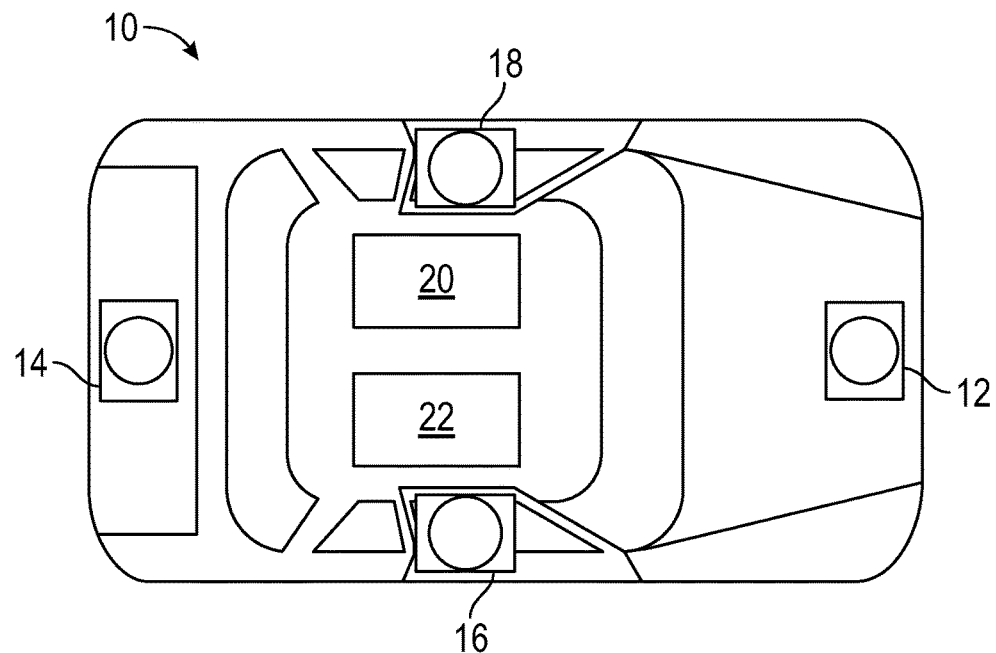
FIG. 1 is an illustration of a vehicle including a surround view camera system having multiple cameras.

FIG. 1 is an illustration of a vehicle 10 that includes a surround view camera system having a front view camera 12, a rear view camera 14, a right-side view camera 16 and a left-side view camera 18. The cameras 12-18 can be any camera suitable for the purposes described herein, many of which are known in the automotive art, that are capable of receiving light, or other radiation, and converting the light energy to electrical signals in a pixel format using, for example, charged coupled devices (CCD). The cameras 12-18 generate frames of image data at a certain data frame rate that can be stored for subsequent processing. The cameras 12-18 can be mounted within or on any suitable structure that is part of the vehicle 10, such as bumpers, facie, grill, side-view mirrors, door panels, etc., as would be well understood and appreciated by those skilled in the art. In one non-limiting embodiment, the side cameras 16 and 18 are mounted under the side view mirrors and are pointed downwards. Image data from the cameras 12-18 is sent to a processor 20 that processes the image data to generate images that can be displayed on a vehicle display 22. For example, as mentioned above, it is known in the art to provide a top down view of a vehicle that provides images near and on all sides of the vehicle.

The present invention proposes an efficient and effective image cropping and stretching process to improve the visual quality of images that are displayed by a Video Processing Module (VPM) of the controller 20 on the display 22. The proposed image cropping and stretching approach provides a wired, frame-based approach to define camera and VPM warping/de-warping and cropping such that optimal resolution of the display 22 is achieved and maintained. As stated above, U.S. Patent Application Publication No. 2014/0085409 A1 discussed above and incorporated herein by reference describes optimizing and maximizing display resolution of one camera view. The image cropping and stretching process described in detail below is capable of optimizing the display resolution of multiple camera views.

Figure 2:
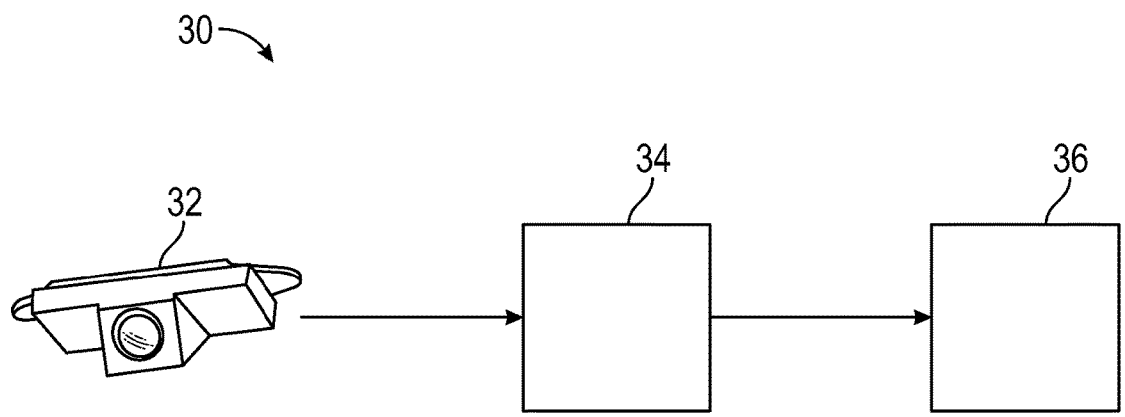
FIG. 2 is an illustration of a known surround view camera system on a vehicle.

FIG. 2 illustrates a known surround view system 30 that includes at least a camera 32, a VPM 34 and a display 36. The camera 32 is a video graphics array (VGA) resolution camera that provides a 180 degree field of view (FOV) and a maximum of 400 lines of resolution of camera images that are capable of being transmitted from the camera 32 to the VPM 34 on an analog cable 38. The analog cable is capable of transmitting a theoretical maximum of 480 lines of resolution. As stated above, the camera 32 produces an image with 400 lines of resolution to the VPM 34 on the cable 38. The VPM 34 crops the image horizontal FOV a predetermined amount, for example, from 180 to 120 degrees, which is a 30% reduction. The VPM 34 also crops the image vertical FOV another predetermined amount, for example, 40% to avoid viewing extensive vehicle body parts, such as a decklid and/or bumper area of the vehicle 10. The image that has 400 lines of resolution from the camera 32 are reduced 30% and 40%, thus, in terms of area, 400×0.7×0.6=400 lines×0.42. In other words, 42% of the 400 lines from the camera 32 are displayed on the display 36 in known surround view systems 30. The percentages described herein are merely exemplary, as a variety of cropping values may be used that provide a variety of percentages of the amount of an original image is displayed on the display 36.

Figure 3:
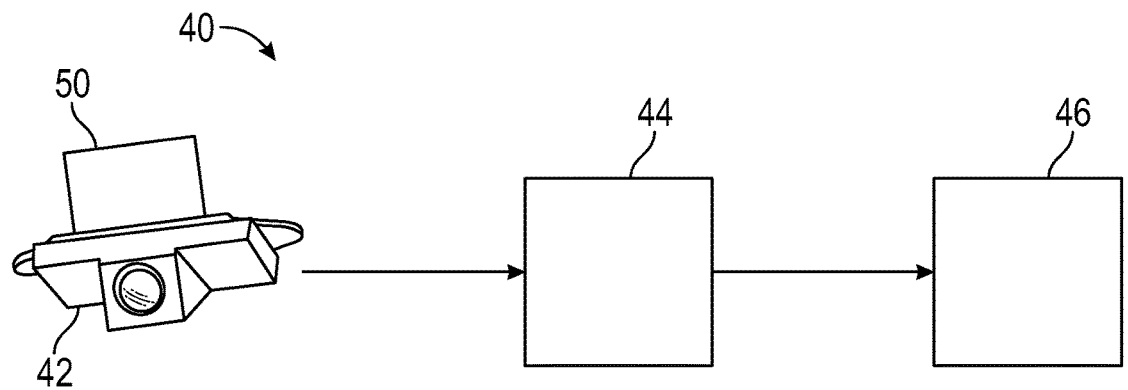
FIG. 3 is an illustration of a mega pixel based surround view camera system on a vehicle that includes a camera module that is programmed to enhance camera images according to the present invention.

FIG. 3 is an illustration of a surround view system 40 according to the present invention that includes at least a camera 42, and typically includes the four cameras 12-18 described above, a VPM 44 and a display 46. The VPM 44 may be part of the processor 20 of the vehicle 10, as stated above. The types of camera(s) that may be used in the system 40 include analog NTSC cameras, mega pixel digital cameras, or a combination thereof, that provide, for example, images with greater than 400 lines of resolution, such as 720 or 800 lines of resolution. Thus, the bottleneck in this system is 480 lines of resolution capability of an analog line 48. Because the theoretical maximum of 480 lines of resolution of the analog lines 48 are used to send the image from the camera 42 to the VPM 44, and also from the VPM 44 to the display 46, that means a maximum of 480 lines are provided to the display 46, although the camera 42 is capable of providing, for example, 720 or 800 lines of resolution. To do this, the camera image may be resized to fit into 480 lines of resolution. As discussed above with respect to the system 30, 42% of 400 lines made it to the display. By using the camera 42, the system 40 is able to achieve greater resolution enhancement, such as the 20% resolution enhancement improvement attained by using a camera that is capable of providing at least 480 lines of resolution compared to the 400 lines of resolution provided by the camera 32 of the system 30. Further, and as described in detail below, the system 40 is capable of additional resolution enhancements that, when combined with the 20% resolution enhancement described above, provide approximately a 100% resolution enhancement improvement as compared to the system 30.

Using the system 40, a module 50 of the camera 42 may crop the horizontal FOV a predetermined amount, for example, from 180 to 155 degrees, which is approximately a 15% reduction. The module 50 of the camera 42 also crops the vertical FOV a predetermined amount, for example, another 30% to avoid extensive vehicle body portions in the display image, such as a decklid and bumper area of the vehicle 10 as described above. Assuming the camera 42 provides 800 lines of resolution, the vertical line cropping is 800×0.70=560 lines. The number of lines referred to herein is in reference to a format, as is known to those skilled in the art, and is similar to the television (TV) industry, where TV resolution is represented in standard definition (SD), e.g., 480i, 480p, and high definition (HD), e.g., 720p, 1080p, etc. While the number of lines used herein represents the number of image lines, it is known to those skilled in the art that for digital display or TV, the resolution is represented by pixels instead of lines. The total pixel numbers, e.g., 1920×1280, determines the resolution of the display area in both the horizontal direction and the vertical direction. Since the aspect ratio of most automotive display units are fixed, e.g., 4:3 or 16:9, vertical resolution, i.e., number of image lines, may be used to represent a display resolution. With this understanding, the resolution decrease that is described above comes from both the horizontal direction (0.85) and the vertical direction (0.70), which may be represented as: 1−0.85×0.70=40.5%. The 40.5% decrease is a decrease in area, however, the vertical lines are decreased to 800 lines× 0.70=560 lines, which is greater than the 480 limit of the analog line 48 described above. Thus, the module 50 of the camera 42 must drop 80 lines of the 560 lines to transmit the lines using the analog line 48. This may be done in any suitable manner known to those skilled in the art, for example, by compressing/resizing the 560 lines to 480 lines. While vertical lines are discussed above, it is to be understood that compressing/resizing may also occur in the horizontal direction.

Once the image that has been cropped by the module 50 of the camera 42, the image is sent to the VPM 44 along the analog line 48. The VPM 44 may further crop the horizontal FOV from 155 to 120 degrees, approximately a 23% change, and the VPM 44 may also crop the vertical FOV another 10%. Thus, in terms of area, 480 lines×0.77×0.9=332 lines that are sent to the display 46, which is approximately 70% of the 480 lines. Put in terms of lines, the vertical line cropping is 480 lines×0.90=432 lines. Cropping via the module 50 of the camera 42 followed by cropping via the VPM 44 provides an additional 66% of resolution enhancement. This 66% enhancement and the 20% enhancement provided by using the camera 42 that provides greater than 400 lines of resolution equates to an approximate 100% resolution enhancement in total when compared to the resolution of the system 30 described above.

How the module 50 of the camera 42 and the VPM 44 are programmed to warp and crop the camera images to produce these resolution enhancements specifically are described in detail below. In general, the 100% resolution enhancement set forth above is achieved using grid-based resolution optimization. Grid-based resolution optimization includes five main steps: (1) placing a target scene grid on the display for FOV and resolution; (2) identify a warped grid in the camera view; (3) identify a minimum FOV for each camera and also identify a warping function based on multiple views, e.g., a perspective view and a top down view; (4) crop each camera image based on the identified minimum FOV and warp the image based on the warping function; and (5) apply an inverse warping function and cropping in the VPM 44 to provide the display image to the vehicle display 46. Each of these steps is described in more detail below.

Figure 4:
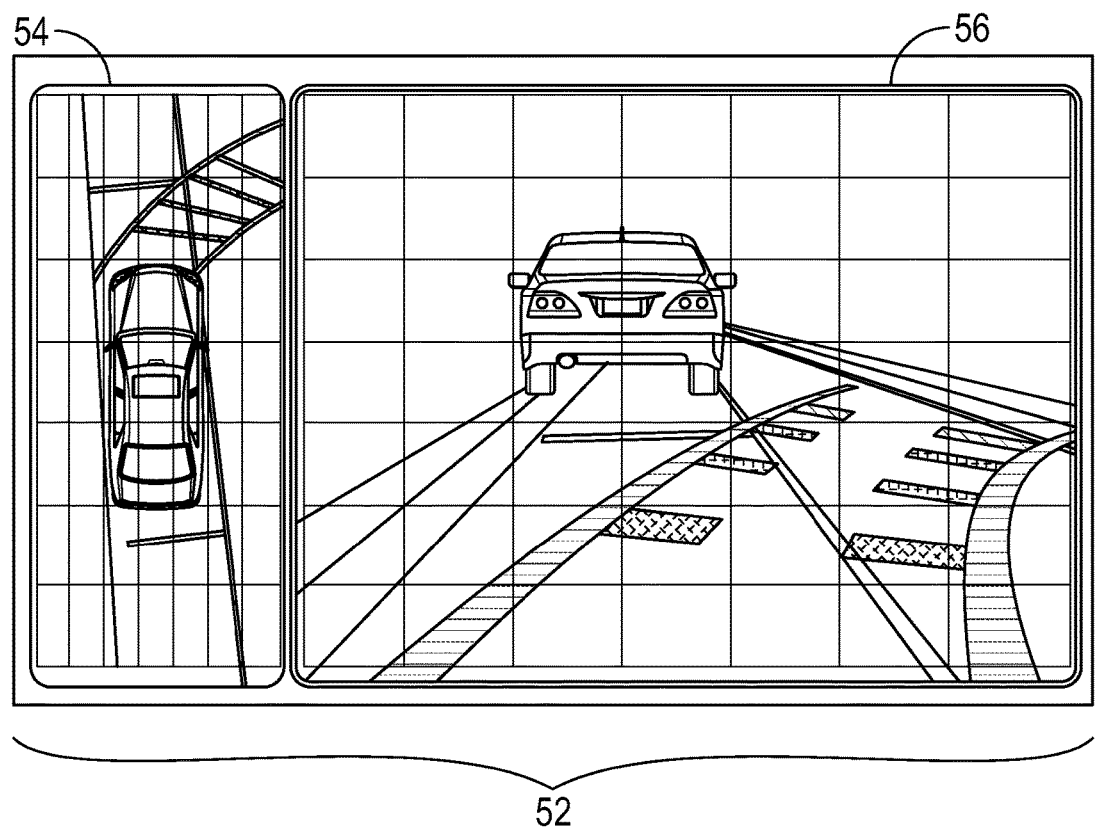
FIG. 4 is an illustration of grid-based resolution optimization using a camera image for an image display.

FIG. 4 is an illustration of the step (1) of the five main steps for grid-based resolution optimization discussed above, i.e., is an illustration of placing target scene grids on a target scene 52 for a FOV and resolution function that is performed in the module of the camera 42 and the VPM 44. A target scene grid for a top down view 54 and a target scene grid for a perspective view 56 are shown as examples.

Figure 5A:
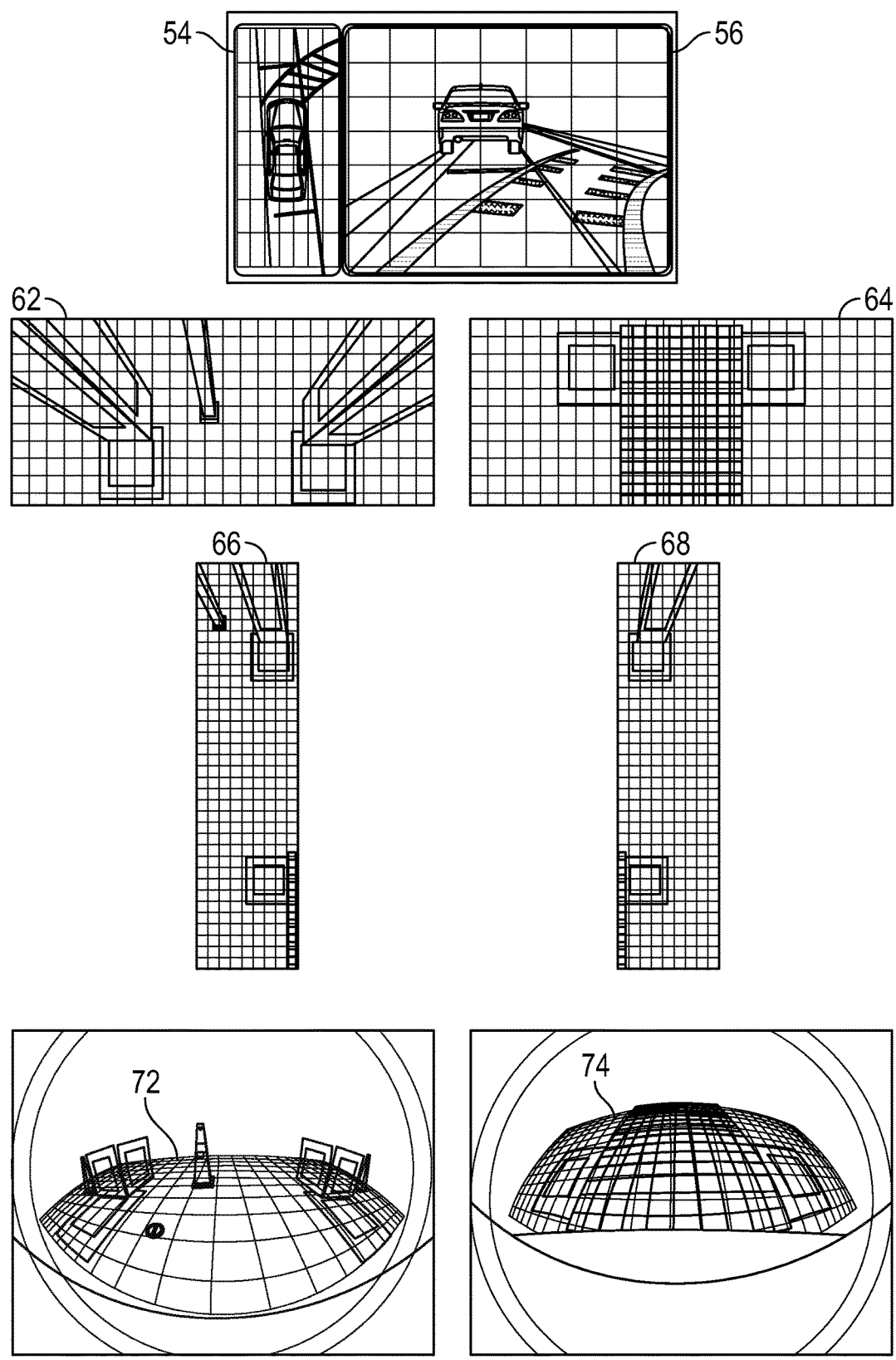
FIGS. 5a and 5b are illustrations of grid-based resolution optimization using several different camera images for an image display.
Figure 5B:
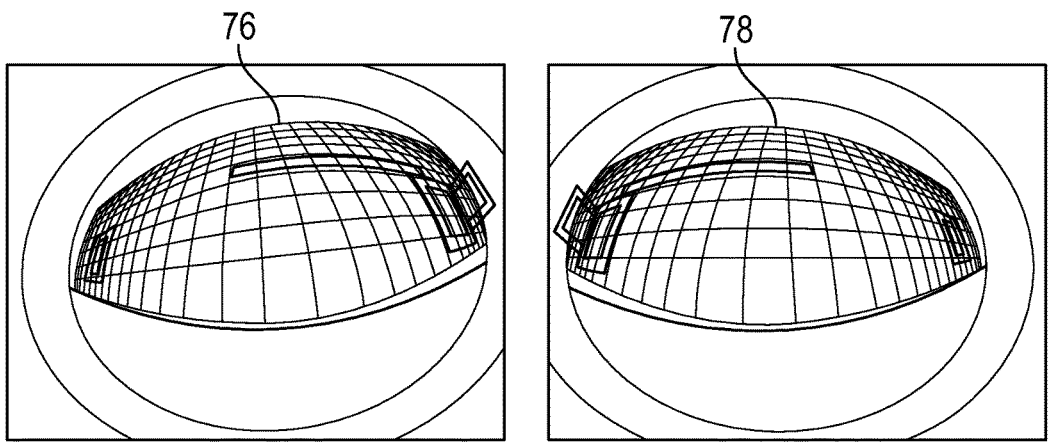

FIGS. 5a and 5b are illustrations identifying the grid correspondence between the top down view and image view in the step (2) of the five main steps for grid-based resolution optimization discussed above. In FIG. 5a, a first top down view 62 is generated from a front camera, a second top down view 64 is generated from a rear camera, a third top down view 66 is generated from a left-side camera and a fourth top down view 68 is generated from a right-side camera. Each of the top down views 62-68 have a uniform grid, meaning all of the sections of the grid are the same size. A front camera view includes a warped grid 72 that is generated based on the warping between the front camera view and the generated top down view 62. A rear camera view includes a warped grid 74 that is generated based on the warping between the rear camera view and the generated top down view 64. In FIG. 5b, a left-side camera view includes a warped grid 76 that is based on the warping between the left-side camera view and the generated top down view 66. A right-side camera view includes a warped grid 78 that is based on the warping between the right-side camera view and the generated top down view 68. Identifying each of the warped grids 72-78 includes back-projection based on camera modeling and camera calibration for top down generation by assuming an environment model known to those skilled in the art, e.g., a flat ground model or a bowl shape model.

Figure 6:
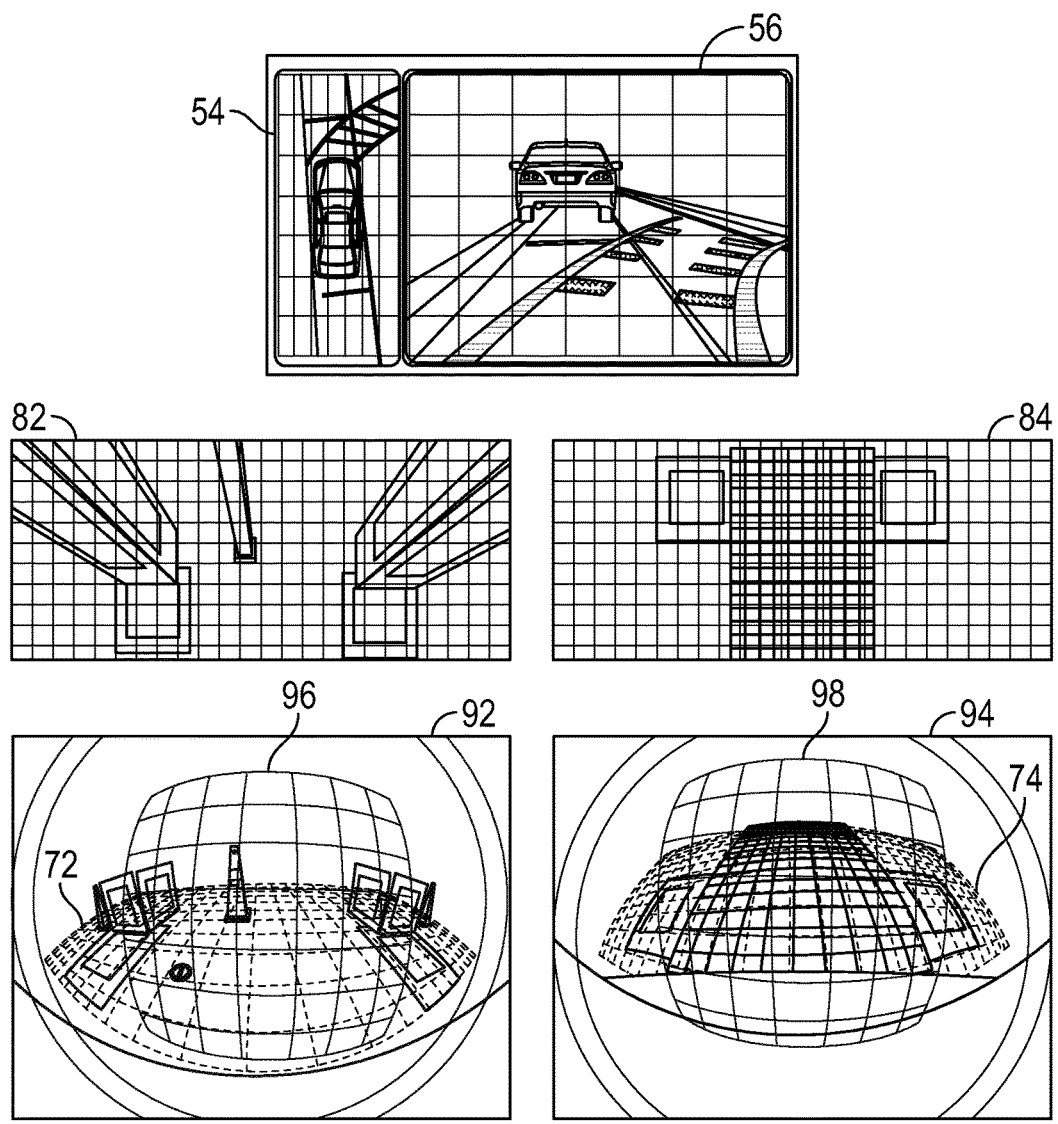
FIG. 6 is an illustration of grid based resolution showing two grids that correspond to different camera images that are used for the image display.

FIG. 6 is an illustration identifying the grid correspondence between the perspective view 56 and an image view in the step (2) of the five main steps for grid-based resolution optimization discussed above, where an additional corresponding warped grid for front and rear perspective views in the camera views are identified. Images 82 and 84 are top down views with uniform grids, and images 92 and 94 are front and rear camera views, respectively. The front camera view 92 includes the warped grid 72 that corresponds to the top down view 62 discussed above with respect to FIG. 5a. An additional warped grid 96 is identified in the image 92 that is generated based on a corresponding perspective view 56. The rear camera view 94 includes the warped grid 74 that corresponds to the top down view 64 discussed above with respect to FIG. 5a. An additional warped grid 98 is identified in the image 94 that is generated based on a corresponding perspective view, such as the perspective view 56. Identifying the additional warped grids 96 and 98 for the front and rear perspective views 92 and 94, respectively, includes a number of image processing approaches for perspective view generation by image/radial distorting correction, image cropping, and/or any additional image enhancement processing.

Figure 7:
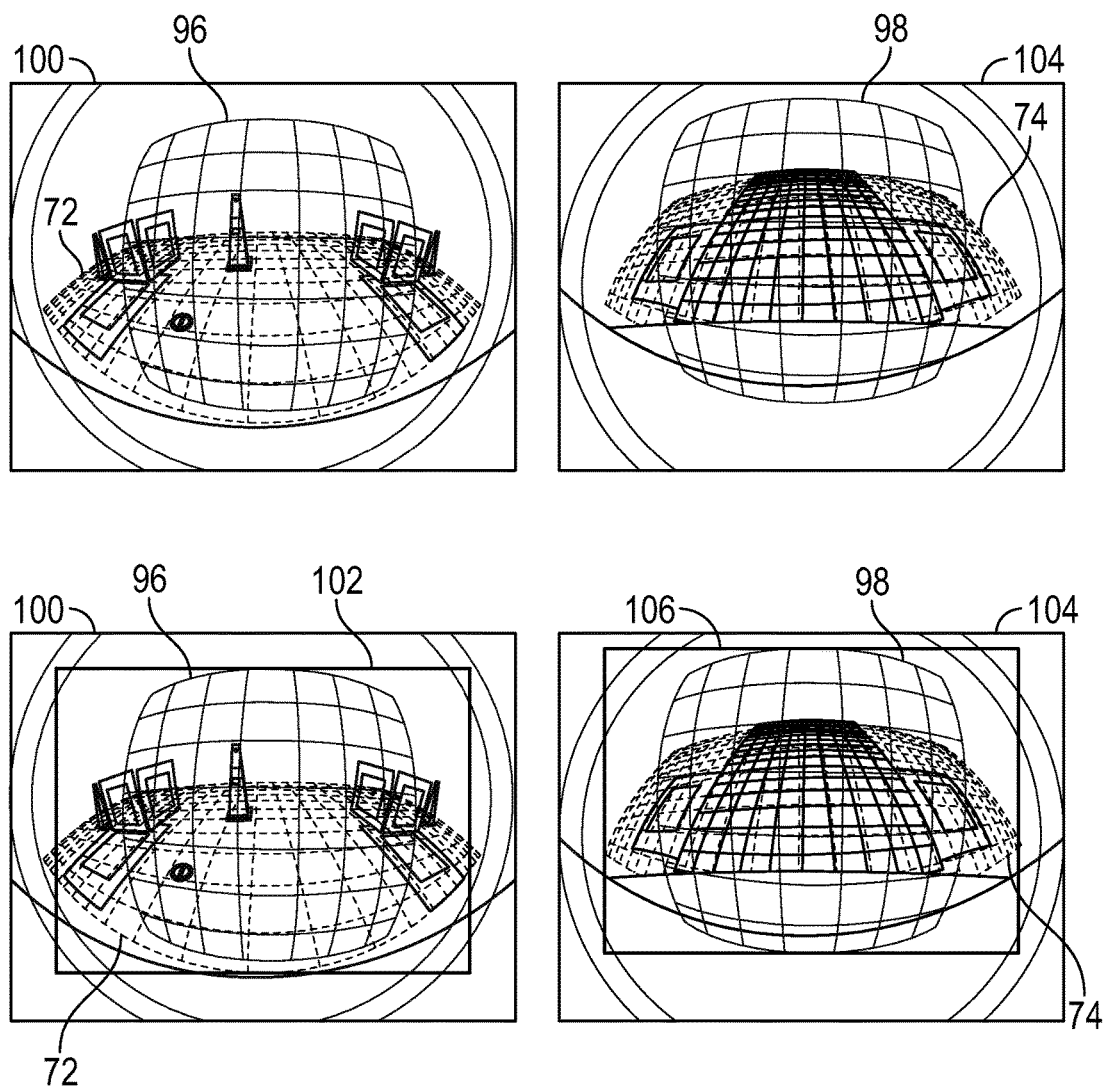
FIG. 7 is an illustration of grid-based resolution enhancement showing a minimum field of view for the image display.

FIG. 7 is an illustration of the step (3) of the five main steps for grid-based resolution optimization discussed above, i.e., illustrates identifying the minimum FOV for each camera (e.g., a front camera and a rear camera) and identifying the warping functions based on multiple warped grids that correspond to the views provided, e.g., a perspective view and a top down view. Front camera FOV image 100 and rear camera FOV image 104 are shown without the minimum FOV identified (top), and with the minimum FOV identified (bottom). A box 102 indicates a minimum FOV region to generate the warping functions $<F_x(x,y), F_y(x,y)>$ that is based on the grids 72 and 96 as shown in the bottom image 100, and a box 106 indicates a minimum FOV region to generate the warping functions $<F_x(x,y), F_y(x,y)>$ that is based on the grids 74 and 98 as shown in the bottom image 104. The minimum FOV is all of the useful area of a camera image. Based on the warping functions $<F_x(x,y), F_y(x,y)>$, the warped image with the smaller FOV is used as the area that provides images to the display 22. How the image is warped/de-warped is described in detail below. In general, the larger sections of the grid are less important in the warping function and the smaller sections are more important because the number of pixels is expanded for the smaller sections from, for example, 4 pixels are mapped to 9 pixels, in the warping function. For the larger sections of the grid, the pixels are reduced to, for example, 100 pixels are mapped to 9 pixels.

Figure 8:
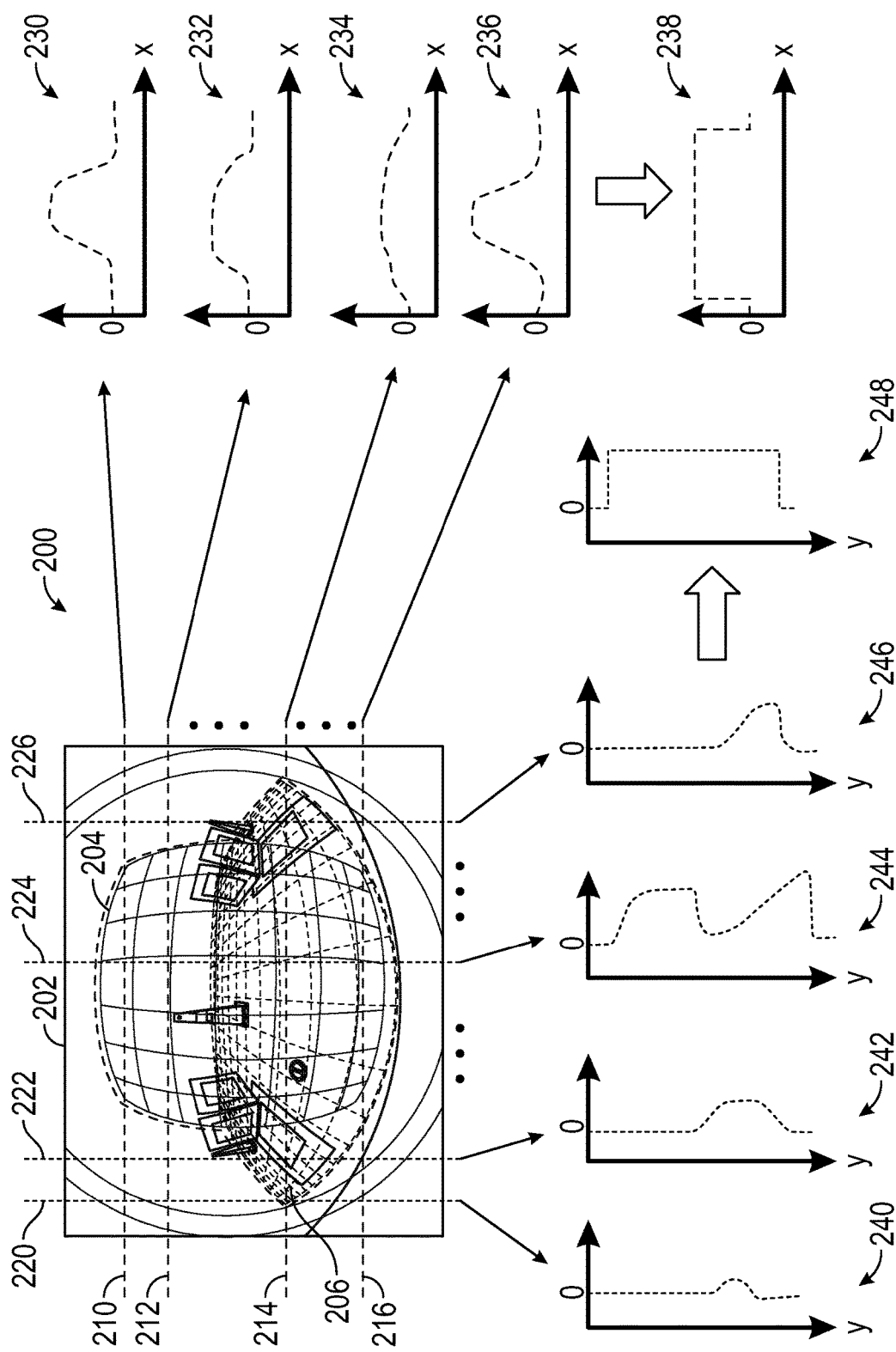
FIG. 8 is an illustration showing a first exemplary method for de-warping an image display image.

FIG. 8 is an illustration showing a first exemplary method 200 for a de-warping/stretching algorithm for a video display image using the warping function discussed above. Image 202 includes a first warped grid 204 and a second warped grid 206. In this example, the first warped grid 204 corresponds to a perspective warped view and the second warped grid 206 corresponds to a top down warped view. The warped grids 204 and 206 are merely exemplary. A variety of warped views may be de-warped as described herein.

The de-warping algorithm determines pixel densities along horizontal lines 210, 212, 214 and 216, and also determines pixel densities along vertical lines 220, 222, 224 and 226. The determined pixel densities may be normalized. A graph 230 corresponds to the pixel density of the line 210, and graph 232 corresponds to the pixel density of the line 212. A graph 234 corresponds to the pixel density of the line 214 and a graph 236 corresponds to the pixel density of the line 216. The lines 210 and 216 are at the upper and lower regions of the warped grid 206, respectively, where the line 210 is crossing the grid 204 but not the grid 206, and where the grid sections are narrower than the grid sections that intersect the lines 212 and 214 that are closer to the center of the warped grid 206. The graphs 230 and 236 have a narrower region where the pixel density is above zero as a result of these narrower regions of the grid 206. The de-warping algorithm corrects this by performing a de-warping/stretching process that adjusts the pixel density of each of the graphs 230-236 such that they each have the same pixel density over the area of interest in the x-axis, as shown in the graph 238.

Graph 240 corresponds to the pixel density of the vertical line 220, and a graph 242 corresponds to pixel density of the vertical line 222. A graph 244 corresponds to the pixel density of the vertical line 224 and a graph 246 corresponds to the pixel density of the vertical line 226. The graphs 240-246 are de-warped/stretched using the de-warping algorithm such that a graph 248 is created that illustrates how the pixel densities are adjusted to provide a uniform pixel density over the area of interest in the y-axis.

Figure 9:
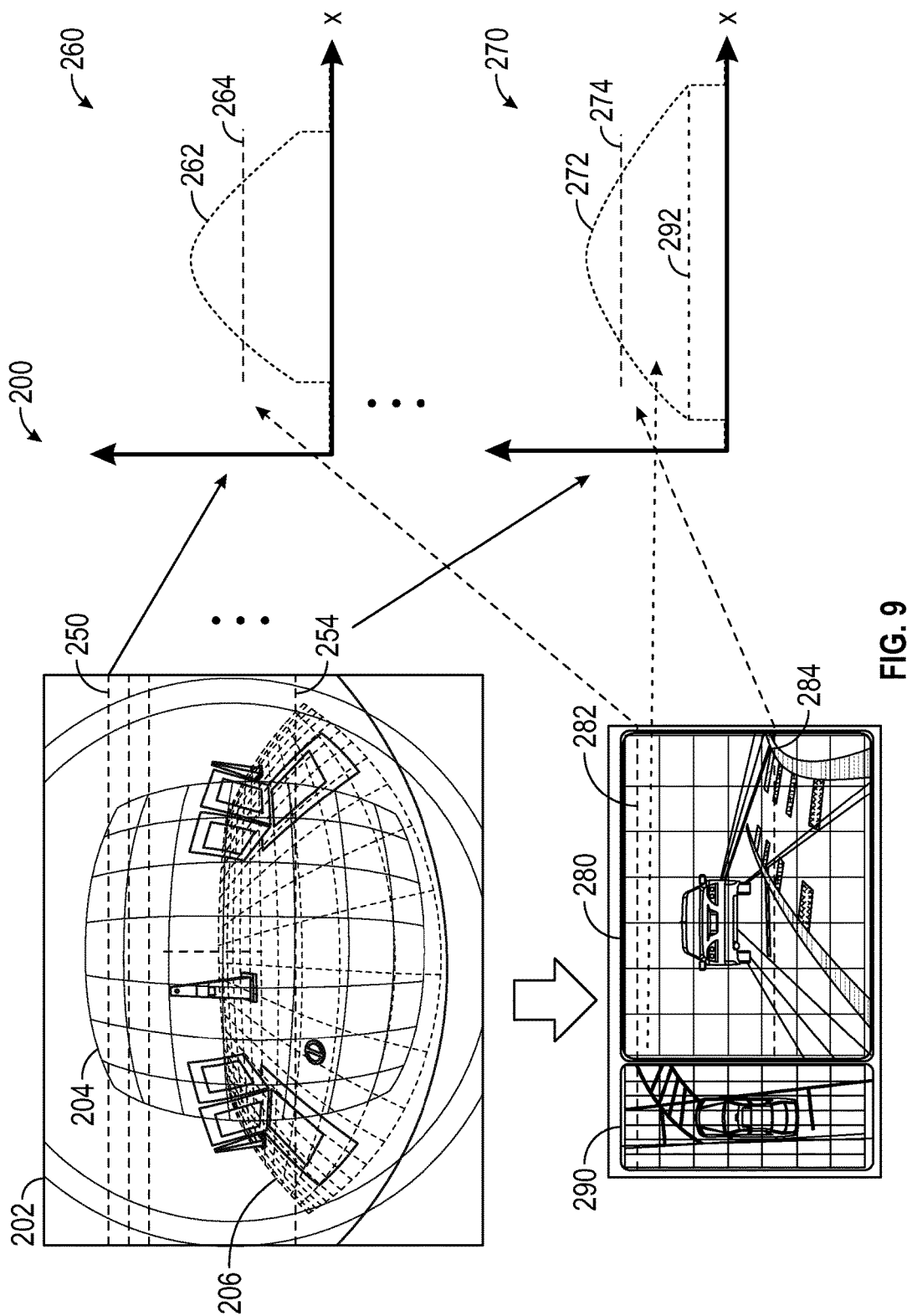
FIG. 9 is another illustration of the first exemplary method for de-warping an image display image.

FIG. 9 is another illustration of the first exemplary method 200 for the de-warping algorithm for a video display where like elements have the same reference numerals of FIG. 8. A line 250 on the image 200 corresponds to the pixel density of the region of the raw image along the line 250, as shown on line 262 of the graph 260. A line 254 on the image 200 corresponds to the pixel density of the region of the raw image along the line 254, as shown on line 272 of graph 270. In each of the graph lines 262 and 272 the flat region corresponds to the area of the image that does not fall within the grid 204 and 206, respectively.

Lines 264 and 274 in the graphs 260 and 270, respectively, correspond to the final perspective view display pixel density for lines 282 and 284 in perspective view image 280. As shown in the graphs 260 and 270, the lines 264 and 274 are cropped in the regions that correspond to portions of the image 280 that are not part of at least one of the grids 204 or 206. The regions that correspond to portions that are not part of at least one of the grids 204 or 206 can be seen along the lines 250 and 254 of the image 202. A line 292 corresponds to a top down view display image pixel density for the top down view display image 290. The line 292 is cropped to exclude those regions of the image 202 that are not part of at least one of the grids 204 or 206 to eliminate unwanted regions before de-warping. All of the lines 264, 274 and 292 are horizontal, indicating that the de-warping and stretching as described above and shown in FIG. 8 has been completed. Also, it can be seen that the pixel density of the perspective view 280, i.e., the line 274, is higher than the pixel density of the top down view 290, i.e., the line 292. The pixel density is smaller for the top down view on the line 292 because the top down view image 290 is smaller than the perspective view image 280 when displayed on the display 22. While FIG. 9 only illustrated describes de-warping in the horizontal plane, it is to be understood that de-warping in the vertical plane also occurs.

Weighted averaging is applied to the warped grids 204 and 206 to determine how to use the grids 204 and 206 to generate the display image 290 and the display image 280. As shown in FIG. 9, the line 282 is used for the top down display view 290. In this case, only the grid 206 is used to generate the image, thus a weighted average is not used. In the display image 280 however, two requirements of two targets are used, one is from a top down view, i.e., the grid 206 and the other from a perspective view, i.e., the grid 204. The contribution of each of the grids 204 and 206 that is used to generate the display image 280 is a predetermined weighted average. The predetermined weighted average may vary based on, for example, the view that is desired to have higher resolution. Typically, more weight will be given to the view that has the highest resolution. Essentially, a balance is struck between the resolution of two display view, e.g., a top down view and a perspective view. Another approach may be to use a smaller grid for one view, which would equate to higher resolution requirements, which would mean that the warped grid that is smaller is given more weight. A person of ordinary skill in the art understands that any suitable weighted average approach may be used. Furthermore, while cropping and stretching/de-warping in the horizontal direction are described in FIG. 9, it is to be understood that the cropping and stretching/de-warping also occurs in the vertical direction.

Figure 10:
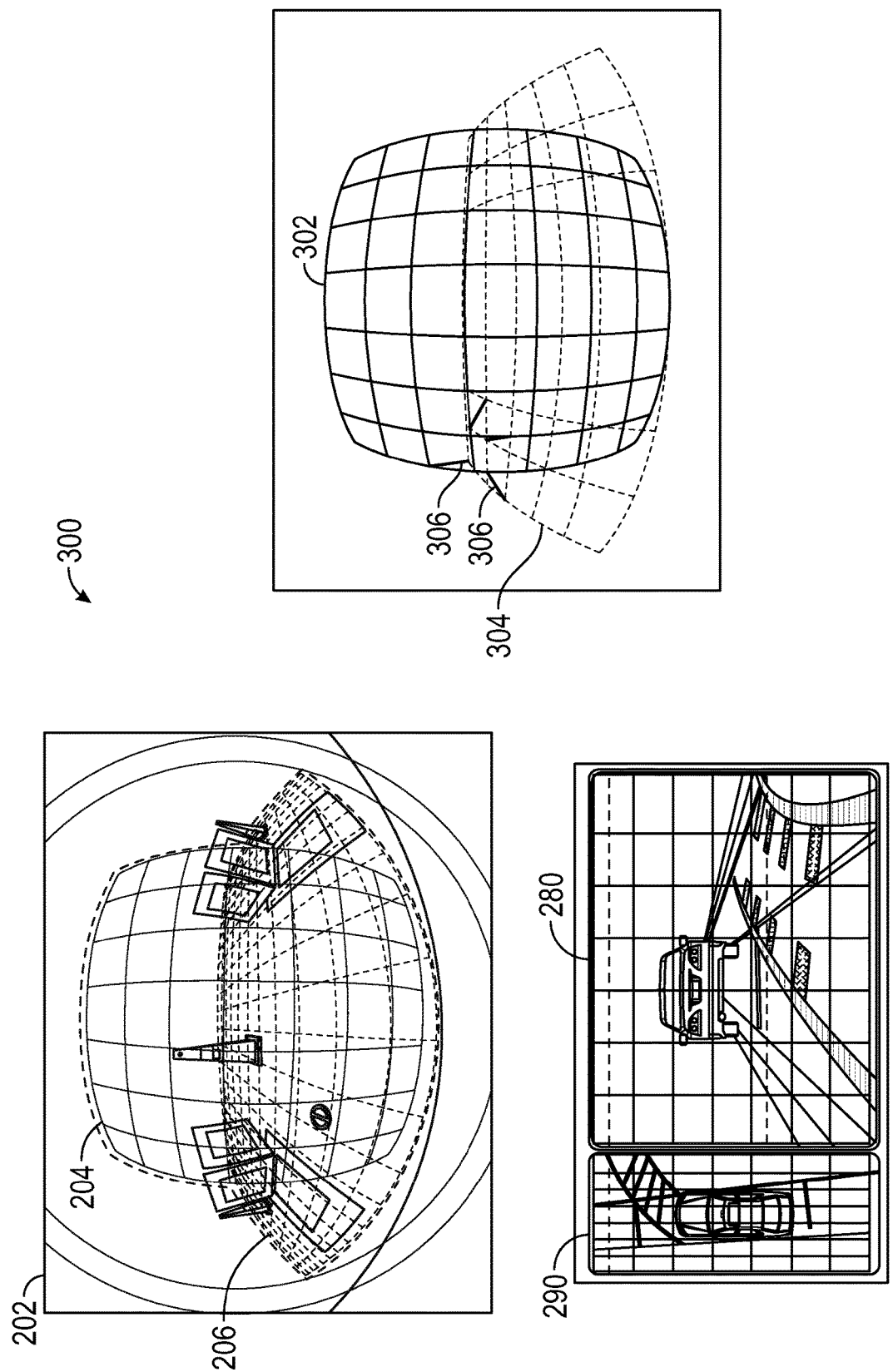
FIG. 10 is an illustration of a second exemplary method for de-warping a image display image.

FIG. 10 is an illustration of a second exemplary method 300 for de-warping a video display image, where the reference numerals of FIG. 9 are used for like elements. According to this method, instead of using a weighted average to generate the display images, grid points from a perspective view grid 302 and a top down view grid 304 are mapped and connected using lines 306 to create a single morphed grid (graph) that uses points from both of the grids 302 and 304. Using the single morphed grid or graph, the graph is stretched into a NTSC (640×480) size graph and the image is de-warped to preserve the maximum resolution.

Figure 11:
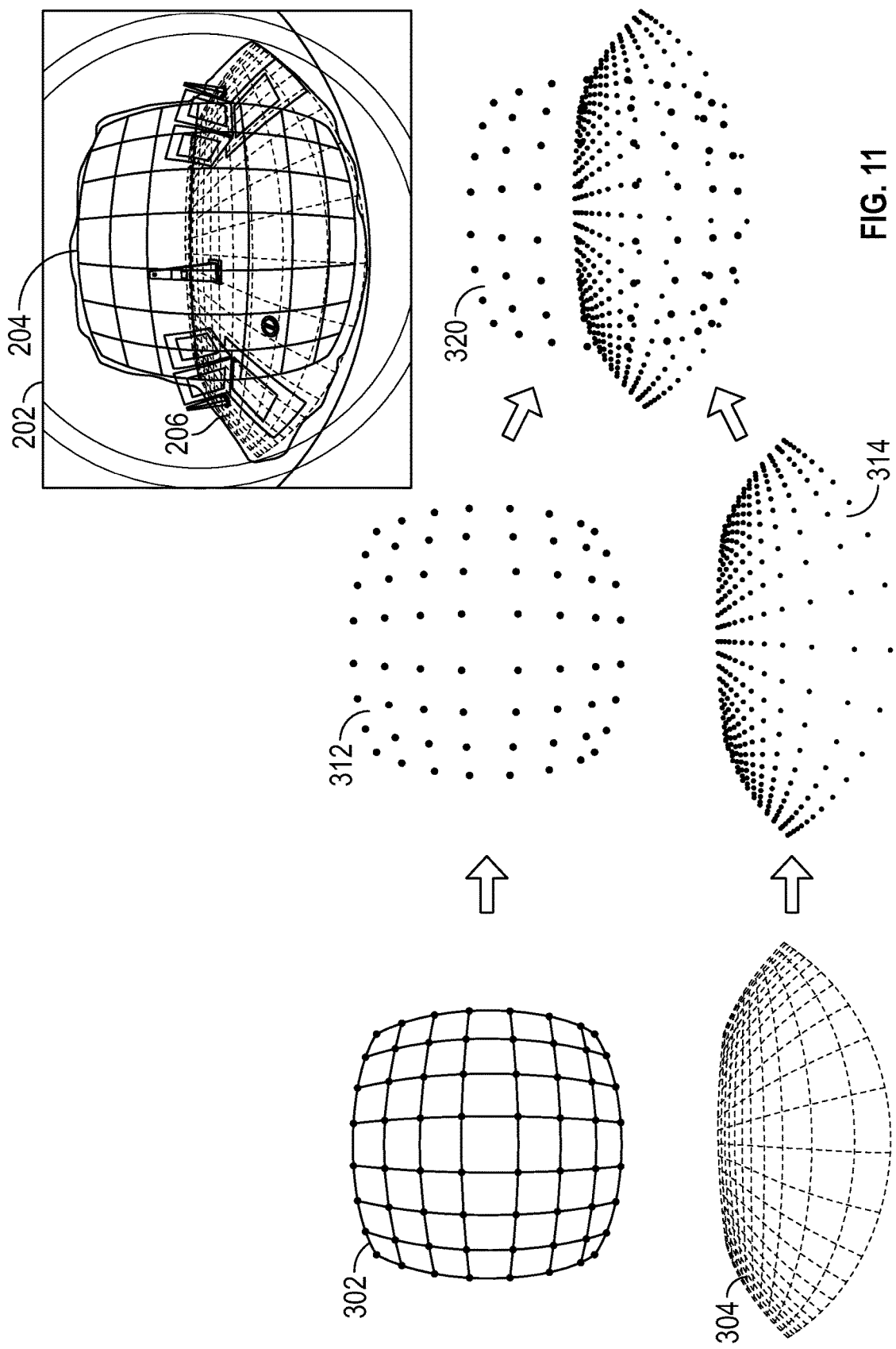
FIG. 11 illustrates additional detail regarding the second exemplary method for de-warping an image display image.

FIG. 11 illustrates more detail regarding how the second exemplary method 300 is performed. The grids 302 and 304 are extracted from the image 202. The grid 302 is converted into grid points 312, and the grid 304 is converted into grid points 314. The grid points 312 and 314 are combined to create a combined set of grid points 320 that correspond to the single morphed grid/graph discussed above.

Figure 12:
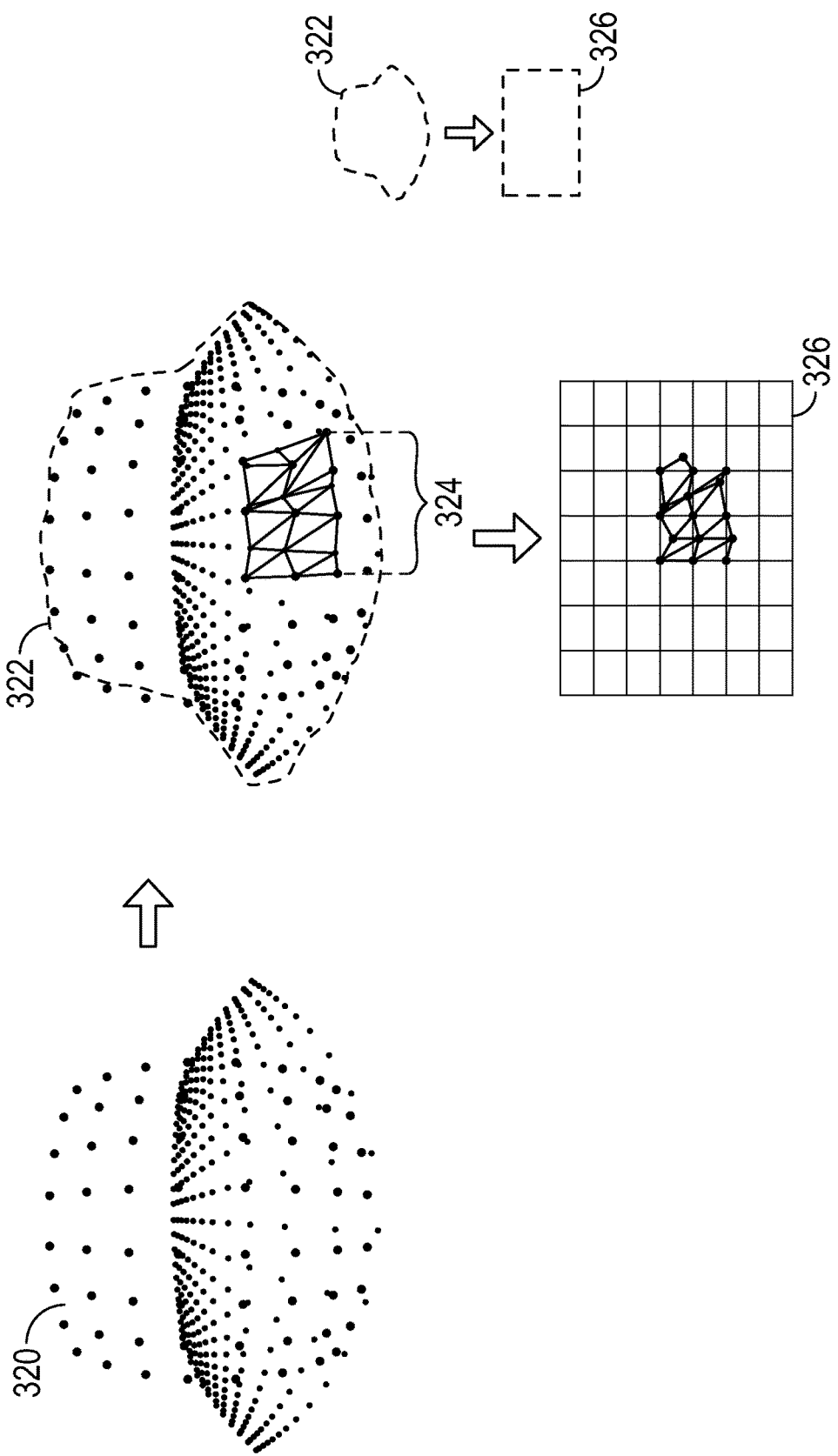
FIG. 12 illustrates further additional detail regarding the second exemplary method for de-warping an image display image.

FIG. 12 illustrates how the combined set of grid points 320 are processed to provide high resolution de-warping. The combined set of grid points 320 are connected to create a mesh, as identified by region 324 within a region 322. While the mesh 324 is shown as a small section in the region 322 for the sake of clarity, let it be known that the mesh 324 is in all areas of region 322. The connecting lines of the mesh 324 may be thought of as having elastic qualities that allow the region 322 to be deformed, i.e., de-warped, into the shape 326 as shown. Thus the irregular shaped mesh that is in the region 322 is deformed such that they mesh into the rectangular shape 326 that is NTSC format in a way that is suitable to provide a high resolution video display by selectively stretching the mesh 324.

Figure 13:
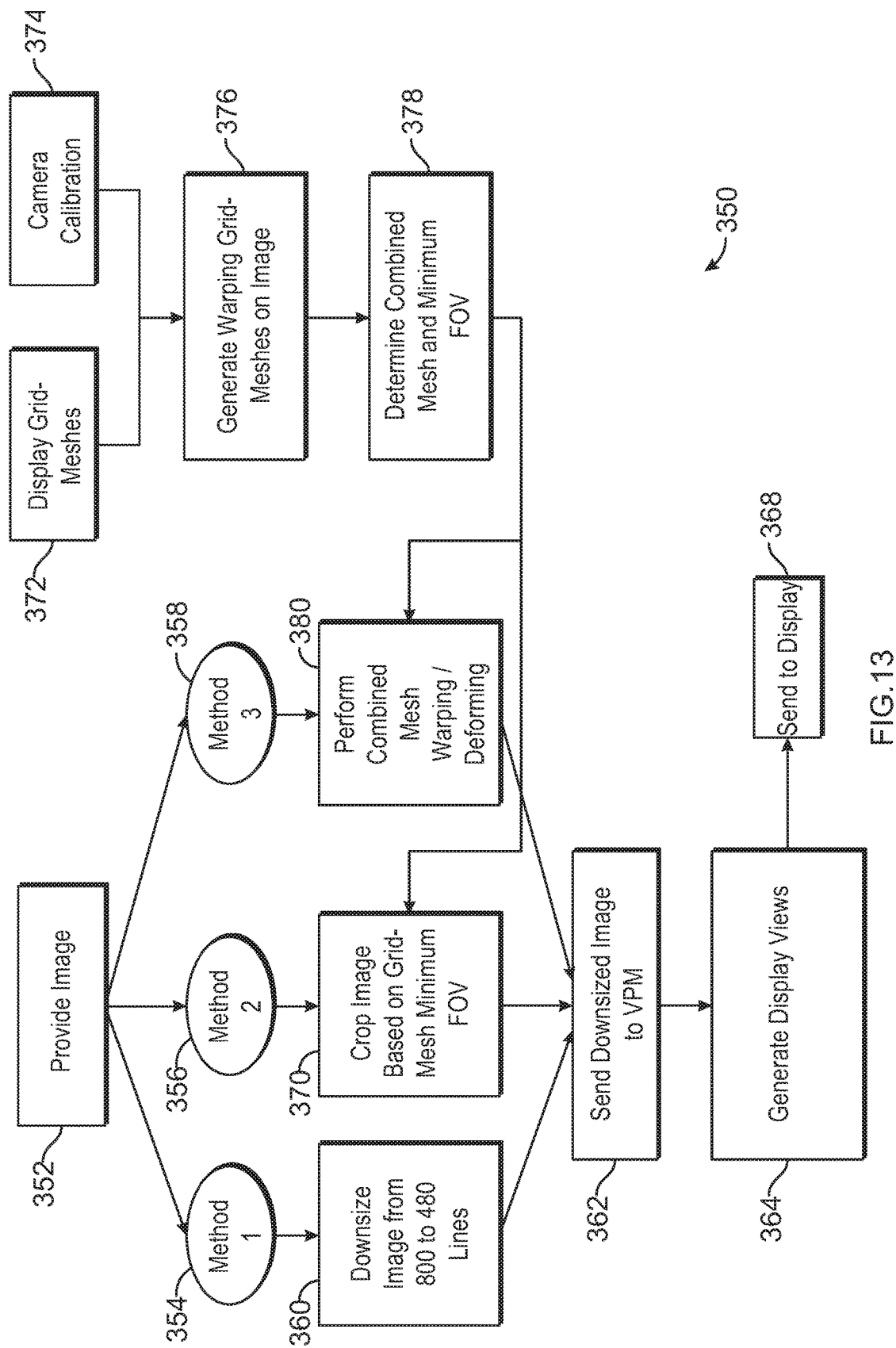
FIG. 13 illustrates a flow diagram of an algorithm that provides image resolution enhancement according to the present invention.

FIG. 13 illustrates a flow diagram of an algorithm 350 that provides image resolution enhancement according to the present invention. At box 352 an image from the camera 42 is provided to the module 50. The module 50 is programmed to make the image a certain size, e.g., 480 lines of resolution, before sending the image to the VPM 44 via the analog line 48. The module 50 may use a first method 354, a second method 356 or a third method 358 to make the image the desired size. The methods 354, 356 and 358 are not exclusive, as the module 50 may process an image using one or more of the methods 354, 356 or 358.

According to the first method 354, the image is downsized from 800 lines to 480 lines at box 360, and sent along the analog line 48 to the VPM 44 at box 362. The VPM 44 may provide additional cropping, and generates display views at box 364 that are sent to the display 46 at box 368.

According to the second method 356, the module 50 performs image cropping based on a grid-mesh minimum field of view at box 370. Cropping that is based on the grid-mesh minimum field of view at the box 370 includes displaying one or more grid meshes at box 372 and camera calibration at box 374. Using the display of one or more grid meshes at the box 372 and the camera calibration at the box 374, the module 50 generates warping grid-mesh(es) on the camera image at box 376 and determines a combined mesh and minimum field of view at box 378. Once the image cropping is complete at the box 370, the image is sent to the VPM 44 via the analog line 48 at the box 362. The VPM 44 may provide additional cropping, and generates display views at the box 364 that are sent to the display 46 at the box 368.

According to the third method 358 for displaying enhanced resolution images, the module 50 performs combined mesh warping or deforming at box 380. Similar to the second method 356, the combined mesh warping or deforming at the box 380 includes displaying one or more grid meshes at the box 372 and camera calibration at the box 374. Using the display of one or more grid meshes at the box 372 and the camera calibration at the box 374, the module 50 generates warping grid-mesh(es) on the camera image at the box 376 and determines a combined mesh and minimum field of view at the box 378. Once the combined mesh warping or deforming is complete at the box 380, the image is sent to the VPM 44 via the analog line 48 at the box 362. The VPM 44 may provide additional cropping, and generates display views at the box 364 that are sent to the display 46 at the box 368.

As will be well understood by those skilled in the art, the several and various steps and processes discussed herein to describe the invention may be referring to operations performed by a computer, a processor, a module, or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing a high resolution display image, said method comprising:
providing a camera image from two or more vehicle cameras to a processor, said camera image capable of being processed into at least two different camera views;
using the processor that is programmed for:
identifying a warped grid in each of the at least two different camera views;
identifying a minimum field of view for displaying each of the at least two different camera views, wherein the minimum field of view includes the identified warped grid for each of the at least two different camera views;
cropping the camera image based on the identified minimum field of view; and
de-warping the warped grid in each of the at least two different camera views to provide the high resolution display image to a vehicle display.

2. The method according to claim 1 wherein de-warping the warped grid in each of the at least two different camera views includes using a weighted average of the warped grids in each of the at least two different camera views to provide the high resolution display image to the vehicle display.

3. The method according to claim 1 wherein de-warping the warped grid in each of the at least two different camera views includes converting each warped grid into grid points and combining the grid points to form a combined mesh that may be stretched to provide the high resolution display image to the vehicle display.

4. The method according to claim 1 wherein the two or more vehicle cameras are analog NTSC cameras, megal pixel cameras, or a combination thereof.

5. The method according to claim 1 wherein the one two or more cameras and the processor are connected via an analog line, said one or more cameras providing a 20% resolution enhancement compared to known cameras, said processor providing an additional 66% resolution enhancement to the camera image such that a 100% total resolution enhancement is achieved for the high resolution display image.

6. The method according to claim 5 wherein the analog line has a theoretical maximum capability of 480 lines of resolution.

7. The method according to claim 1 wherein de-warping the warped grid in each of the at least two different camera views includes applying an inverse warping function that adjusts pixel density to provide a uniform pixel density.

8. A method for providing a high resolution display image, said method comprising:
providing at least two camera images from a front view camera, a right side view camera, a left side view camera, a rear view camera or a combination thereof on a vehicle to a processor, said at least two camera images capable of being processed into at least two different camera views;
using the processor that is programmed for:
identifying a warped grid in each of the camera views;
identifying a minimum field of view for displaying each of the at least two different camera views, wherein the minimum field of view includes the identified warped grid for each of the camera views;
cropping the at least two camera images based on the identified minimum field of view; and
de-warping the warped grid in each of the camera views to provide the high resolution display image to a vehicle display.

9. The method according to claim 8 wherein de-warping the warped grid in each of the camera views includes using a weighted average of the warped grids in each of the camera views.

10. The method according to claim 8 wherein de-warping the warped grid in each of the camera views includes converting each warped grid into grid points and combining the grid points to form a combined mesh that may be stretched to provide a high resolution display image to the vehicle display.

11. The method according to claim 8 wherein the front view camera, the right side view camera, the left side view camera and the rear view camera are analog NTSC cameras, mega pixel cameras or a combination thereof, that are capable of providing a resolution enhancement of the camera image to the processor.

12. The method according to claim 8 wherein the front view camera, the right side view camera, the left side view camera and the rear view camera are connected to the processor via an analog line, said processor providing resolution enhancement of the camera images.

13. The method according to claim 12 wherein the analog line has a theoretical maximum capability of 480 lines of resolution.

14. The method according to claim 12 wherein de-warping the warped grid in each of the camera views includes applying an inverse warping function that adjusts pixel density to provide a uniform pixel density.

15. A grid-based image resolution enhancement system, said system comprising:
a plurality of cameras mounted to a vehicle, said plurality of cameras providing an image that is capable of being processed into at least two different camera views;
a processor for processing the camera image, said processor programmed to identify a warped grid in each of the at least two different camera views and to identify a minimum field of view for displaying each of the at least two different camera views, wherein the minimum field of view includes the identified warped grid for each of the at least two different camera views, said processor further programmed to crop the camera image based on the identified minimum field of view and de-warp the warped grid in each of the at least two different camera views to provide a high resolution display image to a display unit, wherein de-warping the warped grid in each of the at least two different camera views includes applying an inverse warping function that adjusts pixel density to provide a uniform pixel density.

16. The system according to claim 15 wherein de-warping the warped grid in each of the at least two views includes using a weighted average of the warped grids in each of the at least two different camera views.

17. The system according to claim 15 wherein de-warping the warped grid in each of the at least two different views includes converting each warped grid into grid points and combining the grid points to form a combined mesh that may be stretched to provide the high resolution display image.

18. The system according to claim 15 wherein the plurality of cameras are analog NTSC cameras, mega pixel cameras or a combination thereof.

19. The system according to claim 15 wherein the plurality of cameras and the processor are connected via an analog line, said plurality of cameras providing a 20% resolution enhancement compared to known cameras, said processor providing an additional 66% resolution enhancement to the camera image such that a 100% total resolution enhancement is achieved for the high resolution display image.

20. The system according to claim 19 wherein the analog line has a theoretical maximum capability of 480 lines of resolution.

* * * * *